(12) United States Patent
Khan

(10) Patent No.: US 6,421,206 B1
(45) Date of Patent: Jul. 16, 2002

(54) VERTICAL FORCE AND STIFFNESS ENHANCED DISK DRIVE SUSPENSION AND METHOD

(75) Inventor: Amanullah Khan, Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 2 days.

(21) Appl. No.: 09/584,840

(22) Filed: May 31, 2000

Related U.S. Application Data

(60) Provisional application No. 60/190,257, filed on Mar. 17, 2000.

(51) Int. Cl.$^7$ ................................................. G11B 5/48
(52) U.S. Cl. .................................. 360/244.9; 360/245.3
(58) Field of Search .......................... 360/244.3, 244.9, 360/245, 245.7, 245.3

(56) References Cited

U.S. PATENT DOCUMENTS

| | | | | | |
|---|---|---|---|---|---|
| 5,731,931 A | * | 3/1998 | Goss | ........................... | 360/104 |
| 5,734,526 A | * | 3/1998 | Symons | ....................... | 360/104 |
| 5,894,381 A | * | 4/1999 | Allen et al. | ................. | 360/104 |

* cited by examiner

*Primary Examiner*—A. J. Heinz
(74) *Attorney, Agent, or Firm*—Louis J. Bachand

(57) ABSTRACT

A wireless-type disk drive suspension comprising a laminate of a spring metal, an insulative plastic film and trace conductors that exerts insufficient vertical force for the slider to operate effectively on the disk is provided with a secondary spring structure generally opposite the slider and that can incorporate a dimple to increase the suspension stiffness and the vertical force.

16 Claims, 1 Drawing Sheet

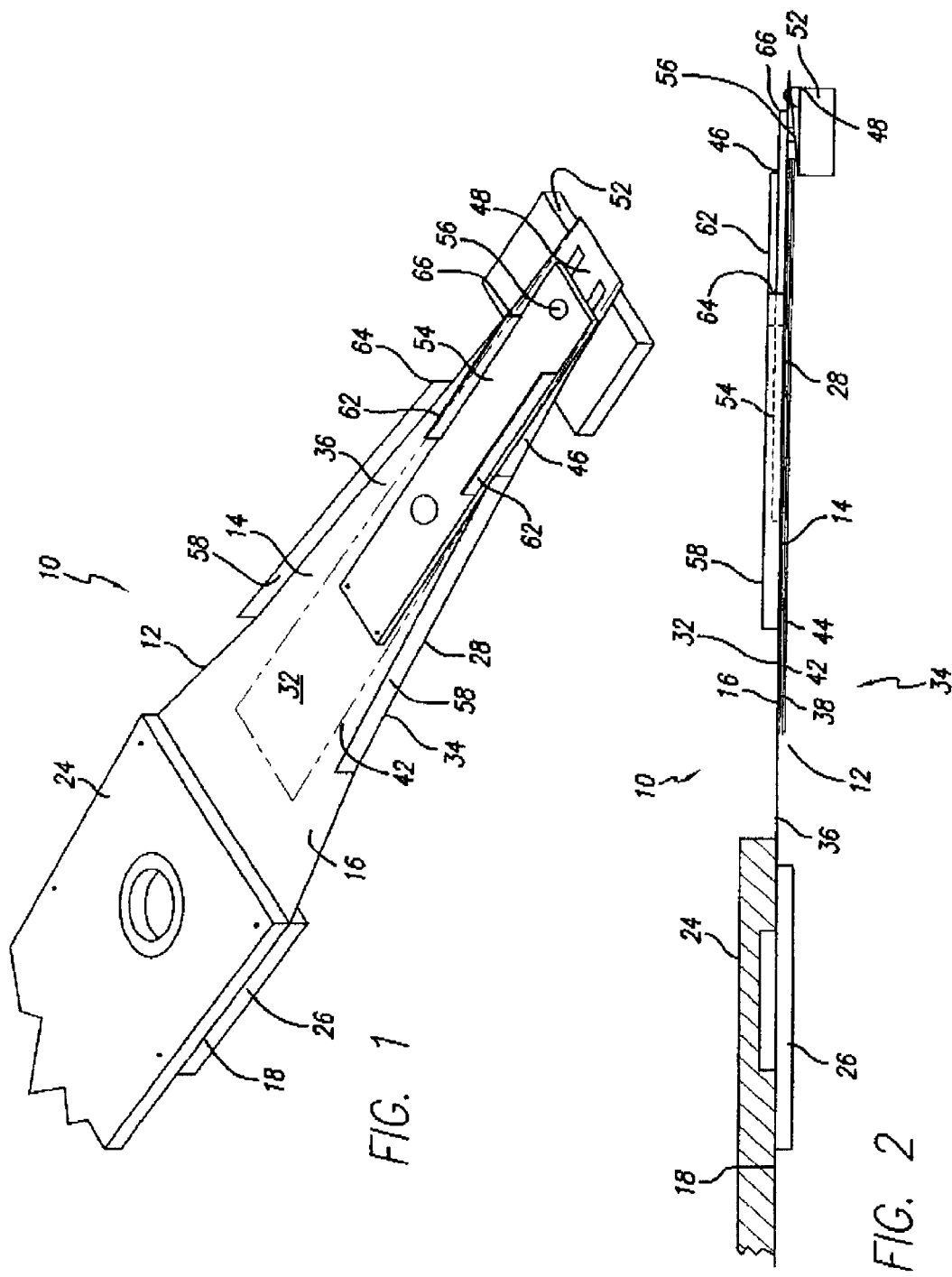

VERTICAL FORCE AND STIFFNESS ENHANCED DISK DRIVE SUSPENSION AND METHOD

CROSS-REFERENCE TO RELATED APPLICATION

This application claims the benefit of U.S. Provisional Application Serial No. 60/190,257 filed Mar. 17, 2000.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention relates to disk drive suspensions, and more particularly to improvements in wireless-type disk drive suspensions. The invention adds a secondary spring structure to the conventional wireless suspension comprising a laminate of a spring metal such as a stainless steel foil, a plastic insulative film such as a polyimide film, and one or more sets of electrical conductors typically comprising copper traces on the insulative film spaced from the spring metal.

2. Description of the Related Art

Wireless-type disk drive suspensions integrate the load beam and flexure functions into a single laminate that is a flexure mounted to an actuator arm. Given the substantially less robust nature of the wireless laminate in comparison with the typical load beam, there is a problem with inadequate force being exerted on the slider for effective operating contact with the disk that militate against using the wireless-type suspension despite certain operating advantages and low cost.

BRIEF SUMMARY OF THE INVENTION

It is an object of the invention, therefore, to provide an improved disk drive suspension of the wireless type. It is a further object to provide a wireless suspension having greater stiffness and that exerts an increased vertical force on the slider than the laminate portion alone. It is a still further object to provide a modified wireless suspension that uses the single laminate of spring metal, insulative film, and conductive traces that is cantilevered from an actuator arm, but that further includes a secondary spring structure that serves to stiffen the suspension, increase vertical force available, and define a dimple for gimballing contact with the slider.

These and other objects of the invention to become apparent hereinafter are realized in a vertical force and stiffness enhanced disk drive suspension comprising a longitudinally extended flexure having a rigid portion, a spring portion and a base portion, the base portion being adapted for mount plate-mounting of the flexure to an actuator arm, the flexure having a front face and a rear face, the flexure comprising a self-supporting laminate of a spring metal, a plastic insulative film, and plural electrically conductive traces spaced from the spring metal by the plastic insulative film, the flexure defining at its distal end a flexure tongue arranged and adapted to carry a slider at the front face of the laminate in operating proximity to a disk, the laminate providing a predetermined vertical force less than that needed for effective operation of the slider, and a secondary spring structure fixed to the laminate rear face in laminate-stiffening and laminate vertical force increasing relation sufficient for effective operation of the slider.

In this and like embodiments, typically, the secondary spring structure defines a dimple in gimballing contact with the tongue, the flexure rigid portion has opposed edge rails, the secondary spring structure has opposed edge rails at least partially between and opposite the flexure rigid portion edge rails, and, the flexure rigid portion has opposed edge rails extending toward the flexure distal end, the secondary spring structure edge rails extending closer to the flexure distal end than the flexure rigid portion edge rails.

In a further embodiment, the invention provides a vertical force and stiffness enhanced disk drive suspension comprising a longitudinally extended flexure having a rigid portion, a spring portion and a base portion, the base portion being adapted for mount plate-mounting of the flexure to an actuator arm, the flexure having a front face and a rear face, the flexure being about 1 mil in thickness and comprising a self-supporting laminate of a spring metal, a plastic insulative film, and plural electrically conductive traces spaced from the spring metal by the plastic insulative film, the flexure defining at its distal end a frame and within the frame flexure tongue arranged and adapted to carry a slider at the front face of the laminate in operating proximity to a disk, the laminate providing a predetermined vertical force less than that needed for effective operation of the slider, and a planar secondary spring structure of about 2 mils in thickness, the secondary spring structure lying parallel with and being fixed to the laminate rear face in laminate-stiffening and laminate vertical force increasing relation sufficient for effective operation of the slider.

In this and like embodiments, typically, the secondary spring structure defines a dimple in gimballing contact with the tongue, the flexure rigid portion has opposed edge rails of about 10 mils in height, the secondary spring structure has opposed edge rails of about 9 mils in height, the edge rails being at least partially between and opposite the flexure rigid portion edge rails, and the flexure rigid portion opposed edge rails have a terminus a predetermined distance from the flexure distal end, the secondary spring structure edge rails having a separate terminus a lesser predetermined distance from the flexure distal end than the flexure rigid portion edge rails.

In its method aspects, the invention provides the method of increasing the vertical force exerted against a slider by a disk drive suspension comprising a laminate of a spring metal, an insulative plastic film, and electrical conductive traces, including superimposing on the laminate a secondary spring structure adapted to stiffen the laminate in the laminate region opposite the slider.

BRIEF DESCRIPTION OF THE SEVERAL VIEWS OF THE DRAWINGS

The invention will be further described in conjunction with the attached drawings in which:

FIG. 1 is an oblique view of the rear face of the invention suspension; and,

FIG. 2 is a side elevation view of the suspension.

DETAILED DESCRIPTION OF THE INVENTION

The invention provides what is generally called a two-piece suspension, in contrast to a three-piece suspension. A three-piece suspension is a three-piece assembly composed of a mount plate, an etched or stamped load beam and an etched flexure. The load beam in a three-piece design allows vertical motion of the suspension by rotation about the short axis of the suspension. The flexure in this design allows the slider to rotate about the long and the short axis of the suspension so that it can follow the drive surface. In addition to the vertical motion, the load beam applies a vertical force onto the slider via the flexure to balance the force developed by the air bearing between the slider and the disk surface. This vertical force is generally transmitted via a dimple formed on the load beam or the flexure. Advantages of a three-piece assembly include a separately designed flexure that can be formed of thinner materials, a separately designed load beam that can be formed of thicker materials, the vertical load is applied to the slider via the flexure, and the flexure can only pitch and roll, so that out of plane motion is avoided. Disadvantages of the three-piece design include manufacturing difficulties in aligning the flexure with the load beam and handling of the trace.

In a two-piece suspension there is a two-piece assembly comprising a mount plate component and an etched load beam/flexure component that is welded to the mount plate. Here, the load beam is designed in such a way that it exerts a vertical force on the slider and allows the slider to rotate about the planar axes of the suspension in what is known as pitch and roll axis motion of the slider or suspension The challenge in a two-piece suspension is to have a one-piece load beam that rotates about the pitch and roll axis of the slider while at the same time exerting the desired vertical force. The rotation about the pitch and roll axis is achieved by a flexure spring designed as a part of the load beam. Achieving the desired softer pitch and roll in the flexure spring design militates against simultaneously realizing the exertion by the load beam of a vertical force of the widely desirable 2 to 3 grams. Advantages of a two-piece suspension assembly include having the flexure as an integral part of the load beam, so that there are no load beam/flexure assembly tolerances, except in their etching, ease of production, and lower costs where a trace type suspension is used.

There are disadvantages associated with prior art two-piece suspensions. These include difficulty in optimizing the pitch and roll stiffness of the suspension because flexure stiffness is low, the flexure spring is soft, and, as a result, the slider experiences vertical motions as the load beam pushes the slider towards the disk because of the absence of a dimple (not formable from the flexure laminate steel layer), and vibration out of plane as the result of the absence of the dimple, and further because of disk run-out and vibration of the actuator and suspension assembly.

Trace type pico suspensions have electrical bond pads at the slider end as well as at the mount plate or extended tail. For a three-piece suspension, positioning of the flexure with trace and bond pads to a load beam is one of the critical tasks. Also, the flexure with trace needs to be separated individually and positioned to load beam from the fret on which it is etched close to adjacent flexures. Handling of delicate individual pieces, and the pick and placement mode of assembly is time consuming, difficult and expensive.

In order to solve the problems of alignment and handling in suspension assembly and to overcome operational problems associated with a two-piece suspension, in accordance with the invention a flexure with trace is welded to a mount plate as in a two-piece suspension and then secondary spring structure comprising a flat piece of spring metal provided with a dimple is welded onto the top of the flexure to hold it in position. The result is that the flexure remains at a desired condition as shown in FIG. 1 and hereinafter described. The secondary added structure is welded to flexure in at least two or three locations. This stiffens the flexure acting as a load beam, and applies pressure to keep the flexure at the desired position, but allows the flexure to gimbal about the dimple. Use of the invention enables elimination of difficult the step of positioning the properly aligned flexure to a load beam, and allows positioning of the flexure directly to the mount plate.

With reference now to the drawings in detail, in FIGS. 1 and 2 the invention vertical force and stiffness enhanced disk drive suspension is shown at 10 and comprises a longitudinally extended flexure 12 having a rigid portion 14, a spring portion 16 and a base portion 18. Flexure 12 is mounted by its base portion 12 to an actuator arm 24 by mount plate 26.

Flexure 12 has a front face 28 and a rear face 32 and comprises a self-supporting laminate 34 of a spring metal 36, a plastic insulative film 38, and plural electrically conductive traces 42 spaced from the spring metal by the plastic insulative film. A protective cover of plastic film 44 overlies the traces 42.

Flexure 12 defines at its distal end 46 a flexure tongue 48 arranged and adapted to carry a slider 52 at the flexure front face 28 in operating proximity to a disk (not shown). Flexure laminate 34 provides a predetermined vertical force less than that needed for effective operation of the slider. Accordingly, a secondary spring structure 54 is fixed to the flexure laminate rear face 32 in laminate-stiffening and laminate vertical force increasing relation sufficient for effective operation of the slider 52.

The secondary spring structure 54 defines a dimple 56 in gimballing contact with the flexure tongue 48 as shown.

To stiffen the flexure rigid portion 14 a pair of laterally disposed, opposed edge rails 58 are provided. Secondary spring structure 54 also has laterally disposed and opposed edge rails 62 that are at least partially between and opposite the flexure rigid portion edge rails 58. Preferably, the flexure rigid portion 14 opposed edge rails 58 extend toward the flexure distal end 46, with the secondary spring structure edge rails 62 similarly extending but extending closer to the flexure distal end 46 than the flexure rigid portion edge rails.

In a further preferred embodiment, the flexure 14 is 1 mil in thickness, the secondary spring structure 54 is planar and of about 2 mils in thickness, lying parallel with and being fixed to the laminate rear face in laminate-stiffening and laminate vertical force increasing relation sufficient for effective operation of the slider. The flexure rigid portion 14 preferably has its opposed edge rails 58 be about 10 mils in height, while the secondary spring structure 54 has its opposed edge rails, more distally advanced that the edge rails 58, and generally parallel therewith, be about 9 mils in height. Thus arranged, typically, the edge rails 62 are at least partially between and opposite the flexure rigid portion edge rails 58. Edge rails 58 have a terminus 64 a predetermined distance from the flexure distal end 46. The secondary spring structure edge rails 62 have a separate terminus 66 a lesser predetermined distance from the flexure distal end 46 than the flexure rigid portion edge rails 58.

In the invention method, the vertical force exerted against the slider 52 by disk drive suspension 10 is increased by superimposing on the flexure laminate 34 the secondary spring structure 54 that is adapted to stiffen the laminate in the laminate region opposite the slider.

The invention thus provides an improved disk drive suspension of the wireless type having greater stiffness and that exerts an increased vertical force on the slider than the flexure laminate portion alone comprising a modified wireless suspension that uses the single laminate of spring metal, insulative film, and conductive traces that is cantilevered from an actuator arm, that further includes a secondary spring structure that serves to stiffen the suspension, increase vertical force available, and define a dimple for gimballing contact with the slider.

The foregoing objects are thus met.

I claim:

1. A vertical force and stiffness enhanced disk drive suspension comprising a longitudinally extended flexure having a rigid portion, a spring portion and a base portion, said base portion being adapted for mount plate-mounting of said flexure to an actuator arm, said flexure having a front face and a rear face, said flexure comprising a self-supporting laminate of a spring metal, plural electrically conductive traces, and locally between said conductive traces and said spring metal in spacing relation a plastic insulative film, said flexure defining at its distal end a flexure tongue arranged and adapted to carry a slider at the front face of said laminate in operating proximity to a disk, said laminate providing a predetermined vertical force less than that needed for effective operation of said slider, and a secondary spring structure having a face opposing said laminate rear face, said secondary spring structure opposing face being at all points equidistant from said laminate rear face, said secondary spring structure being fixed to said laminate rear face in laminate-stiffening and laminate vertical force increasing relation sufficient for effective operation of said slider.

2. The vertical force and stiffness enhanced disk drive suspension according to claim 1, in which said secondary spring structure defines a dimple in gimballing contact with said tongue.

3. The vertical force and stiffness enhanced disk drive suspension according to claim 1, in which said flexure rigid portion has opposed edge rails.

4. The vertical force and stiffness enhanced disk drive suspension according to claim 3, in which said secondary spring structure has opposed edge rails at least partially between and opposite said flexure rigid portion edge rails.

5. The vertical force and stiffness enhanced disk drive suspension according to claim 1, in which said secondary spring structure has opposed edge rails.

6. The vertical force and stiffness enhanced disk drive suspension according to claim 5, in which said secondary spring structure defines a dimple in gimballing contact with said tongue.

7. A vertical force and stiffness enhanced disk drive suspension comprising a longitudinally extended flexure having a rigid portion, a spring portion and a base portion, said base portion being adapted for mount plate-mounting of said flexure to an actuator arm, said flexure having a front face and a rear face, said flexure comprising a self-supporting laminate of a spring metal, plural electrically conductive traces, and locally between said conductive traces and said spring metal in spacing relation a plastic insulative film, said flexure defining at its distal end a flexure tongue arranged and adapted to carry a slider at the front face of said laminate in operating proximity to a disk, said laminate providing a predetermined vertical force less than that needed for effective operation of said slider, and a secondary spring structure having opposed edge rails and defining a dimple, said flexure rigid portion having opposed edge rails extending toward said flexure distal end, said secondary spring structure edge rails extending closer to said flexure distal end than said flexure rigid portion edge rails, said secondary spring structure being fixed to said laminate rear face in laminate-stiffening and laminate vertical force increasing relation sufficient for effective operation of said slider.

8. A vertical force and stiffness enhanced disk drive suspension comprising a longitudinally extended flexure having a rigid portion, a spring portion and a base portion, said base portion being adapted for mount plate-mounting of said flexure to an actuator arm, said flexure having a front face and a flat rear face, said flexure comprising a self-supporting laminate of a spring metal, and plural electrically conductive traces and locally between said conductive traces and said spring metal in spacing relation a plastic insulative film, said flexure defining at its distal end a flexure frame and within said flexure frame a frame flexure tongue arranged and adapted to carry a slider at the front face of said laminate in operating proximity to a disk, said laminate providing a predetermined vertical force less than that needed for effective operation of said slider, and a planar secondary spring structure, said secondary spring structure having a planar face extending across the width of said secondary spring structure, said planar face being at all points parallel with said laminate rear face, said secondary spring structure being fixed to said laminate rear face in laminate-stiffening and laminate vertical force increasing relation sufficient for effective operation of said slider.

9. The vertical force and stiffness enhanced disk drive suspension according to claim 8, in which said secondary spring structure defines a dimple in gimballing contact with said tongue.

10. The vertical force and stiffness enhanced disk drive suspension according to claim 9, in which said flexure rigid portion has opposed edge rails.

11. The vertical force and stiffness enhanced disk drive suspension according to claim 10, in which said secondary spring structure has opposed edge rails, said edge rails being at least partially between and opposite said flexure rigid portion edge rails.

12. The vertical force and stiffness enhanced disk drive suspension according to claim 10, in which said secondary spring structure opposed edge rails are of lesser height than said flexure rigid portion edge rails.

13. The vertical force and stiffness enhancing disk drive suspension according to claim 8, in which said conductive traces are disposed on said laminate rear face between said laminate spring metal and said secondary spring structure, said laminate spring metal being free of insulative film except substantially at said conductive traces.

14. A vertical force and stiffness enhanced disk drive suspension comprising a longitudinally extended flexure having a rigid portion with opposed edge rails, a spring portion and a base portion, said base portion being adapted for mount plate-mounting of said flexure to an actuator arm, said flexure having a front face and a rear face, said flexure comprising a self-supporting laminate of a spring metal, and plural electrically conductive traces and locally between said conductive traces and said spring metal in spacing relation a plastic insulative film, said flexure defining at its distal end a flexure frame and within said flexure frame a frame flexure tongue arranged and adapted to carry a slider at the front face of said laminate in operating proximity to a disk, said laminate providing a predetermined vertical force less than that needed for effective operation of said slider, and a planar secondary spring structure having opposed edge rails, said secondary spring structure defining a dimple in gimballing contact with said tongue and lying parallel with and fixed to said laminate rear face in laminate-stiffening and laminate vertical force increasing relation sufficient for effective operation of said slider, said flexure rigid portion opposed edge rails having a terminus a predetermined distance from said flexure distal end, said secondary spring structure edge rails having a separate terminus a lesser predetermined distance from said flexure distal end than said flexure rigid portion edge rails.

15. The vertical force and stiffness enhancing disk drive suspension according to claim 14, in which said conductive traces are disposed on said laminate rear face between said laminate spring metal and said secondary spring structure, said laminate spring metal being free of insulative film except substantially at said conductive traces.

16. A method of increasing the vertical force exerted against a slider by a disk drive suspension comprising a laminate of a spring metal, an insulative plastic film, and electrical conductive traces, said laminate having a front face and a rear face, including superimposing and fixing on said laminate a secondary spring structure having a face, said secondary spring structure face being at all points equidistant from said laminate rear face, said secondary spring structure being adapted to stiffen said laminate.

* * * * *